United States Patent [19]

Iijima

[11] Patent Number: 5,082,495
[45] Date of Patent: Jan. 21, 1992

[54] INK COMPOSITION
[75] Inventor: Zenshiro Iijima, Abiko, Japan
[73] Assignee: Adger Kogyo Co., Ltd., Japan
[21] Appl. No.: 502,938
[22] Filed: Apr. 2, 1990
[30] Foreign Application Priority Data Apr. 21, 1989 [JP] Japan .................. 1-103204

[51] Int. Cl.⁵ .............................. C09D 11/00
[52] U.S. Cl. ........................ 106/21; 106/20
[58] Field of Search ................... 106/21, 19

[56] References Cited

U.S. PATENT DOCUMENTS

| | | | |
|---|---|---|---|
| 1,761,347 | 6/1930 | Kharasch | 106/19 |
| 2,578,425 | 5/1948 | Hershkowitz | 106/19 |
| 3,997,498 | 12/1976 | Reese et al. | 106/19 |
| 4,657,591 | 4/1987 | Shioi et al. | 106/23 |

FOREIGN PATENT DOCUMENTS 0211621  2/1987  European Pat. Off. .
3044035  5/1982  Fed. Rep. of Germany .

Primary Examiner—William R. Dixon, Jr.
Assistant Examiner—Margaret V. Einsmann
Attorney, Agent, or Firm—Lorusso & Loud

[57] ABSTRACT

A substantially colorless, transparent ink composition which affords erasable, white ink images includes an organic solvent, an organic substance which is dissolved in the organic solvent, which has a molecular weight of less than 1,000 and which is a white or colorless solid at room temperature, and a polymer which is dissolved in the organic solvent and which has a molecular weight of at least 10,000.

8 Claims, No Drawings

INK COMPOSITION

This invention relates to an ink composition affording white ink images which are erasable, for example, by wiping with a wet cloth impregnated with water or an organic solvent or by heating. The present invention is also concerned with a writing instrument utilizing the above ink.

Various erasable inks are known and are utilized in the field of, for example, sewing or arts and crafts. The known erasable inks now on the market, however, are predominantly of a type which gives blue or dark color ink images and, therefore, are not suited for writing on a dark-colored surface. Known white colored inks generally contain a white pigment or dye and are not easily erasable.

U.S. Pat. No. 4,744,826 issued to Zenshiro Iijima discloses an aqueous transparent ink composition affording erasable, white ink images. This composition contains an amine complex salt of zinc. Upon use, the amine complex decomposes to liberate ammonia and to leave white zinc hydroxide. Thus, this ink has a problem that odor of ammonia emanates upon use.

The present invention has been made to solve the above-mentioned problems and contemplates provision of an ink composition which gives easily erasable, white ink images.

In accordance with the present invention there is provided a substantially colorless, transparent ink composition comprising:

(a) an organic solvent;

(b) an organic substance which is dissolved in said organic solvent, which has a molecular weight of less than 1,000 and which is a white or colorless solid at room temperature, the amount of said organic substance being at least 10 % based on the total weight of said organic solvent and said organic substance; and (c) a polymer which is dissolved in said organic solvent and which has a molecular weight of at least 10,000, said ink composition turning white upon use.

The ink composition of the present invention is substantially colorless and transparent. When applied on a fabric, paper, leather or the like surface, however, the ink image becomes white colored as a result of evaporation of the solvent with the simultaneous deposition of the organic substance on the applied portion. The resulting white ink images may be easily removed by, for example, wiping with a wet cloth impregnated with water or an organic solvent or heating with an iron.

The present invention will now be described in detail below.

Any organic solvent may be used for the purpose of the present invention as long as it can dissolve the organic substance used as a colorant. Illustrative of suitable solvents are alcohols, ethers, ketones, esters and halogenated hydrocarbons. Since it is generally desired to shorten the period of time through which the applied ink turns white, the use of a solvent having a low boiling point, especially a boiling point of 30°-150° C. is preferred.

Particularly suitable solvents are ketones and aliphatic monohydric alcohols having a boiling point of 50°-100° C. When the polymer which is to be incorporated into the ink composition of the present invention and which serves as a penetration inhibiting ingredient is hardly soluble in such an aliphatic monohydric alcohol, then it is recommendable to use a halogenated hydrocarbon in conjunction with the monohydric alcohol. Thus, the solvent is preferably selected from methanol, ethanol, isopropyl alcohol, isobutyl alcohol, secondary amyl alcohol, tertiary amyl alcohol, acetone, methyl ethyl ketone, chloroform, dichloroethane, trichloroethane, acetonitrile and mixtures thereof.

Any solvent soluble, relatively low molecular weight organic substance may be used as a colorant for the ink composition of the present invention as long as it is by itself a colorless or white solid at room temperature. Since it is convenient and desirable that the written ink images be erased by water-wet cloth, the use of a water-soluble organic substance is preferable.

Illustrative of suitable organic substances are aminoquinoline, benzoic acid, 3-oxy-1,4-pyrone, quinazoline, chlorofumaric acid, tolylenediamine, salicylic acid, 2,4,6-trioxynaphthalene, o-phenylenediamine homocatechol, phtalic acid, acetylsalicylic acid, dichlorobenzene, acetonaphalide, acetoxime, aminobenzyl alcohol, isosaccharic aicd, isovanillic acid, teraconic acid, indazole, ethylurea, ethylmalonic acid, hydroxy-p-toluic acid, oxy-2-naphthoic acid, oxyhydroquinone, 2-hydroxypyridine, m-hdroxyphenylacetic acid, hydroxybenzyl-alcohol, -hydroxybutylic acid, orcinol, ethyl carbamate, valeramide, quinonechloroimine, glyoxime, glutaconic acid, chlorobenzoic acid, colchicine, diethylurea, dihydroxynaphthalenedihydroxyphthalic acid, diglycolic acid, cyclohexane dicarboxylic acid, dichloroacetamide, dichlorophthalic acid, dihydroresorcin, dibromosuccinic acid, dimethylnitroamine, dimethylurea, dimethylpyrone, dimethylphosphinic acid, dimethylresorcin, sulfamoylbenzoic acid, sulfobenzoic acid, thioacetamide, desoxalic acid, tetrahydroxybenzene, tetrolic acid, triaminobenzene, trihydroxyanthracene, trihydroxy-naphthalene, trichlorolactic acid, tribromoacetic acid, trimethylfluoroglycine, naphthalene sulfonic acid, nitrophthalic acid, hydrocoumalic acid, hydrotoluquinone, bipyridine, pyrazole, pyridinecarboxylic acid, o-phenylenediamine, fulminuric acid, bromopropionic acid, bromomaleic acid, hexahydrosalicylic acid, hyxahydroterephthalic acid, pentaglycerine, homochatecol, formylbenzoic acid, methyl-hydantoin, cresorcinol, malic acid and leucic acid.

Above all, the use of water-soluble substances, such as salicylic acid, acetylsalicylic acid and benzoic acid, are especially preferably used because they give clear white images which are easily erased when wiped with a wet cloth impregnated with water. The use of sublimable substances is also preferred since the resulting ink images vanish when heated with a heater such as an iron or when allowed to stand for a suitable period of time.

In order to obtain clear ink images, the organic substance serving as a colorant should be used in an amount of at least 10% by weight, preferably 15% by weight based on the total weight of the organic solvent and the organic substance. The upper limit is a concentration providing the saturated solution. Since a saturated solution is apt to form solids due to the evaporation of the solvent, it is desired that the upper limit of the content of the organic substance be maintained slightly below the saturation concentration, preferably 95% of the saturation concentration. Preferred content of the organic substance is 70-95% of the saturation concentration.

The ink composition additionally contains a polymer having a molecular weight of at least 10,000. The polymer is used in an amount sufficient to prevent the organic substance from being absorbed quickly in a paper or cloth on which an ink pattern is to be formed. Any polymer may be used for controlling the penetrability of the ink composition as long as it is soluble in the solvent used. Illustrative of suitable polymers are poly(ethylene oxide), poly(vinylpyrrolidone), poly(vinyl butyral), polyacrylate, poly(vinyl acetate), phenol resins, shellac, rosin, dammar and copal. The polymer serves to prevent the occurrence of blurs of the ink images. Polyethylene oxide having an average molecular weight of about $10^5$ to $5 \times 10^6$ is especially suitable for the purpose of the present invention. The amount of polymer used varies with its molecular weight but is generally 0.001–10 g per 100 g of the total weight of the solvent and the organic substance.

The ink composition according to the present invention is suitably used for a writing instrument having a porous or fibrous tip, such as a felt-tip pen. The ink is contained in an ink tank which is in fluid communication with the tip.

The letters or patterns written with such a writing instrument are initially illegible. After a period of, for example, 2–15 seconds, the ink image turns white as a result of evaporation of the solvent. The ink image may be erased by wiping with an organic solvent-impregnated cloth. When the organic substance used as a colorant is soluble in water, the ink image may also be erased with a water-impregnated cloth. The ink image may be vanished when heated at a temperature above the boiling point of the organic substance. When a sublimable compound is used as the organic substance, the resulting ink image vanishes with time.

The following examples will further illustrate the present invention.

EXAMPLE 1

Benzoic acid (36 g) was dissolved in 100 g of isopropyl alcohol to obtain a first solution and 0.5 g of poly(ethylene oxide) having a molecular weight of $1.7 \times 10^6$ to $2.2 \times 10^6$ was dissolved in 50 g of methylene chloride to obtain a second solution. The first solution (100 g) was then mixed with 10 g of the second solution to obtain a colorless, transparent ink composition. This composition was charged in an ink tank of a felt-tip pen. A pattern was drawn on a black fabric with the pen. A clear, white image was obtained after 5 seconds from the drawing. This image was able to be erased by wiping with a water-impregnated wet cloth. By ironing the fabric, the ink image also vanished. The felt-tip pen was also able to write easily on a leather.

EXAMPLE 2

Benzoic acid (37 g) was dissolved in 100 g of a mixed solvent consisting of 80 g of isopropyl alcohol and 20 g of methylene chloride, in which 0.6 g of poly(ethylene oxide) having a molecular weight of $1.7 \times 10^6$ to $2.2 \times 10^6$ was further dissolved, thereby to obtain a colorless, transparent ink composition. This composition was charged in an ink tank of a felt-tip pen. A pattern was drawn on a black fabric with the pen. A clear, white image was obtained after 3 seconds from the drawing. This image was able to be erased by wiping with a water-impregnated wet cloth. By ironing the fabric, the ink image also vanished. The felt-tip pen was also able to write easily on a leather.

EXAMPLE 3

Salicylic acid (35 g) was dissolved in 100 g of a mixed solvent consisting of 80 g of isopropyl alcohol and 20 g of ethanol to obtain a first solution and 2.5 g of poly(ethylene oxide) having a molecular weight of $6 \times 10^5$ to $1.1 \times 10^6$ was dissolved in 50 g of ethylene dichloride to obtain a second solution. The first solution (150 g) was then mixed with 5 g of the second solution to obtain a colorless, transparent ink composition. This composition was charged in an ink tank of a felt-tip pen. A pattern was drawn on a black fabric with the pen. A clear, white image was obtained after 3 seconds from the drawing. This image was able to be erased by wiping with a water-impregnated wet cloth. By ironing the fabric, the ink image also vanished. The felt-tip pen was also able to write easily on a leather.

EXAMPLE 4

Salicylic acid (36 g) was dissolved in 100 g of a mixed solvent consisting of 80 g of isopropyl alcohol and 20 g of ethylene dichloride, in which 0.5 g of poly(ethylene oxide) having a molecular weight of $6 \times 10^5$ to $1.1 \times 10^6$ was further dissolved, thereby to obtain a colorless, transparent ink composition. This composition was charged in an ink tank of a felt-tip pen. A pattern was drawn on a black fabric with the pen. A clear, white image was obtained after 3 seconds from the drawing. This image was able to be erased by wiping with a water-impregnated wet cloth. By ironing the fabric, the ink image also vanished. The felt-tip pen was also able to write easily on a leather.

EXAMPLE 5

Acetylsalicylic acid (23 g) was dissolved in 100 g of a mixed solvent consisting of 80 g of isopropyl alcohol and 20 g of ethylene dichloride, in which 0.2 g of poly(ethylene oxide) having a molecular weight of $3.3 \times 10^6$ to $3.8 \times 10^6$ was further dissolved, thereby to obtain a colorless, transparent ink composition. This composition was charged in an ink tank of a felt-tip pen. A pattern was drawn on a black fabric with the pen. A clear, white image was obtained after 3 seconds from the drawing. This image was able to be erased by wiping with a water-impregnated wet cloth. By ironing the fabric, the ink image also vanished. The felt-tip pen was also able to write easily on a leather.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A substantially colorless, transparent ink composition comprising:
   (a) an organic solvent;
   (b) salicyclic acid or acetylsalicyclic acid dissolved in said organic solvent in an amount of at least 15% based on the total weight of said organic solvent said salicyclic acid or acetylsalicyclic acid; and
   a polymer which is dissolved in said organic solvent and which has a molecular weight of at least 10,000, said ink composition turning white upon use.

2. An ink composition as set forth in claim 1, wherein said organic solvent is selected from the group consisting of alcohols, ethers, ketones, esters and halogenated hydrocarbons.

3. An ink composition as set forth in claim 2, wherein said organic solvent has a boiling point of 50°-100° C.

4. An ink composition as set forth in claim 3, wherein said organic solvent is selected from the group consisting of methanol, ethanol, isopropyl alcohol, isobutyl alcohol, secondary amyl alcohol, tertiary amyl alcohol, acetone, methyl ethyl ketone, chloroform, dichloroethane, trichloroethane, acetonitrile and mixtures thereof.

5. An ink composition as set forth in claim 1, wherein said polymer is a member selected from the group consisting of polyethylene oxide, polyvinylpryrrolidone, polyvinylbutylal, polyacrylate, polyvinyl acetate, polyvinyl butyral, phenol resins, shellac, rosin, dammar and copal.

6. An ink composition as set forth in claim 1, wherein and polymer is polyethylene oxide having a molecular weight of about $10^5 - 5 \times 10^6$.

7. A writing instrument having a porous or fibrous tip and an ink tank which is in fluid communication with said tip and which contains an ink composition according to claim 1, so that a letter or pattern written with said writing instrument is colored white.

8. An ink composition in accordance with claim 1 wherein said salicyclic acid or acetylsalicyclic acid is dissolved in an amount at least 70-95% of saturation.

* * * * *

UNITED STATES PATENT AND TRADEMARK OFFICE
CERTIFICATE OF CORRECTION

PATENT NO. : 5,082,495
DATED : January 21, 1992
INVENTOR(S) : Zenshiro IIJIMA

It is certified that error appears in the above-identified patent and that said Letters Patent is hereby corrected as shown below:

Col. 4, line 61, "salicyclic" should read --salicylic-- and "acetylsalicyclic" should read --acetylsalicylic--;

line 64, "salicyclic" should read --salicylic-- and "acetylsalicyclic" should read --acetylsalicylic--.

Col. 6, line 13, "salicyclic" should read --salicylic-- and "acetylsalicyclic" should read --acetylsalicylic--.

Signed and Sealed this

Thirteenth Day of December, 1994

Attest:

BRUCE LEHMAN

*Attesting Officer*                 *Commissioner of Patents and Trademarks*